June 25, 1968 M. RUSSELL 3,390,364

VARIABLE REACTOR HAVING COIL AND SIGNAL
COILS ON TOROIDAL CORE
Filed March 15, 1967

Inventor:
Martyn Russell
By
Hradolph, Love, Rogers & Van Sciver
Attys

United States Patent Office 3,390,364
Patented June 25, 1968

3,390,364

VARIABLE REACTOR HAVING COIL AND SIGNAL COILS ON TOROIDAL CORE

Martyn Russell, Elgin, Ill., assignor to Coilcraft, Inc., Cary, Ill., a corporation of Illinois Filed Mar. 15, 1967, Ser. No. 623,335
8 Claims. (Cl. 336—110)

ABSTRACT OF THE DISCLOSURE

A variable reactor of the saturable core type is provided. Core is formed as a sleeve or hollow toroid and control and signal coils are wound thereon, one circumferentially and the other toroidally, to prevent signal induction between coils. Initial magnetic biasing of the core is provided for, including a movable magnetic slug for bias trimming.

This invention relates to variable reactors and more particularly to an electrical circuit element which operates to vary the reactance in one or more circuits, which for convenience will be referred to as "signal circuits," in response to the fluctuations of a current in a "control" circuit, while preventing the control circuit fluctuations or frequency from being induced into the one or more signal circuits.

Devices of this general character, commonly called saturable reactors, are becoming of increasing utility for many purposes and they, therefore, appear in a considerable diversity of physical sizes, inductance values, ranges of operation, efficiencies, designs and so on. As a specific example, an inductor of this type is in use in most color television receivers which have rectangular picture tubes. Its purpose is to provide for top and bottom pin-cushion correction. Specific circuits for providing such correction need no discussion here, since this invention is directed to variable inductors for use as circuit elements rather than to circuits for their use.

For purpose of orientation, however, it may well be added that in the example mentioned above, the television vertical scanning signal is modulated by the horizontal sweep signal so as to provide what amounts to top and bottom barrel distortion of the horizontal sweep. This distortion compensates for the pin-cushion effect caused by the fact that the viewing screen is flatter than a spherical surface with its center of curvature at or near the guns. The almost universal expedient for accomplishing this modulation is to use the horizontal sweep signal to vary the inductance of a saturable reactor connected in the vertical scanning circuit at the horizontal sweep frequency, and this must be done without inducing the horizontal sweep frequency into the vertical circuit.

A basic saturable reactor consists essentially of a saturable iron core having two coils thereon. If a direct current control voltage is connected across one of these coils, it will change the degree of core saturation and this will change the inductance and reactance of the other coil. If, however, an AC or other rapidly variable, voltage is connected across the control coil, this also will vary the core saturation, but the device will operate as a transformer and induce the control frequency into the signal coil. To prevent this, the prior art expedient is to provide two interconnected control coils in a carefully balanced coil and core circuit, such that the alternating or other rapidly fluctuating current in the control coils changes the degree of saturation throughout the magnetic circuit, and then to put the signal coil or coils upon a leg of the magnetic circuit which is connected between two positions of zero external magnetic field.

If everything is in balance, the degree of saturation of at least a portion of the magnetic circuit through the signal coils will fluctuate at the control frequency rate, but the flux density through the signal coil will not change, and so the control frequency will not be induced into the signal circuits. Usually, also, an adjustable permanent magnet of some sort is located near the magnetic circuit in a position to partially saturate a selected segment of the magnetic circuit. This has the effect of shifting operation of the system along the saturation curve to a point which is most appropriate to the particular application.

As might be expected, a problem inherent in a variable reactor of this type is the high cost of providing the multiple control coils and the rather elaborate magnetic circuit, and the care necessary to insure the electrical and magnetic balance throughout the system and the proper positioning of the permanent magnet.

In view of the above, it is a principal object of this invention to provide a novel variable reactor of the saturable core type which does not depend upon balancing to avoid induction as between the control and signal coils.

Another object is to provide a novel variable reactor of the above type which requires only a single control coil and in which inductive coupling between the control and any reasonable number of signal coils is inherently avoided.

Still another object is to provide a novel variable reactor of the above type in which major permanent magnet biasing elements may be easily adjusted to appropriate position at the time of manufacture and in which additional minor adjustments may be made at any time without disturbing the major adjustment.

Yet another object is to provide a novel variable reactor of the type described in a variation of the basic design which offers higher gain and better shielding for applications where such refinements are significant and a somewhat higher cost is justified.

An additional object is to provide a novel variable reactor of the type described which can be manufactured for considerably less than the usual cost, which is smaller, more rugged and stable, and more easily assembled into circuits than prior art devices which are intended to serve the same or similar purpose.

Other objects and advantages will become apparent from the following description of a preferred embodiment of the invention which is illustrated in the accompanying drawings.

In the drawings in which similar characters of reference indicate similar parts throughout the several views.

Figure 1:
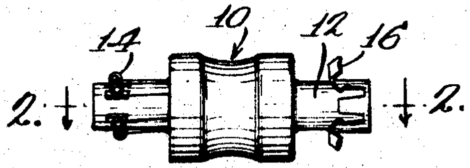
FIG. 1 is a side view of a variable reactor embodying the present invention.

In FIG. 1 the principal active portion of the reactor is shown at 10. This portion is mounted at about the center of a paper tube 12, which in the final assembly has coil terminals 14 at one end and a conventional snap-in spring metal mounting clip 16 at the other adapted to fit an appropriate chassis cut-out.

Figure 2:
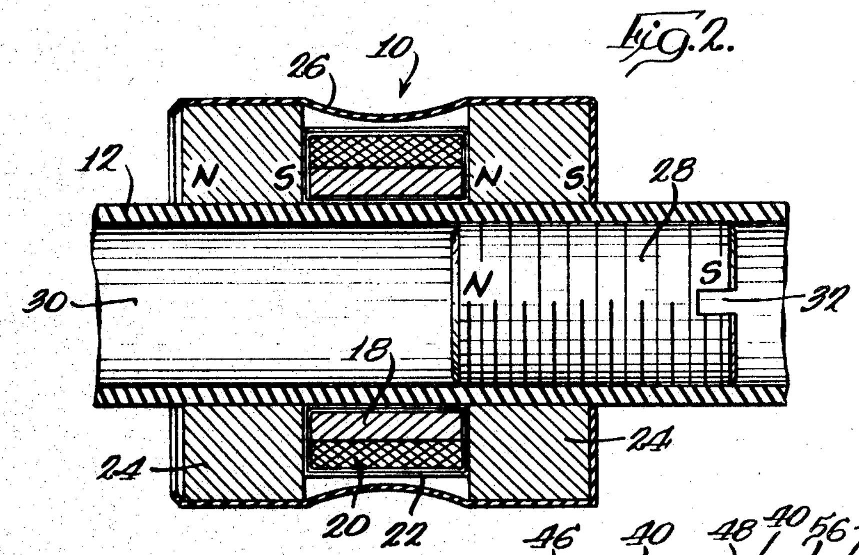
FIG. 2 is an enlarged longitudinal medial sectional view of the essential elements of the reactor and may be considered as taken in the direction of the arrows along the line 2—2 of FIG. 1.

As shown in FIG. 2, a cylindrical sleeve 18, formed of a soft magnetic material, such, for instance, as one of the ferrites, has a passage therethrough to fit the tube 12 rather loosely. This sleeve is the saturable element and can be made of any of the suitable materials ordinarily used for this purpose in saturable reactors.

The single control coil 20 is in this instance bobbin wound upon the external cylindrical surface of the sleeve almost completely from end to end and has whatever number of turns are required for a particular circuit to shift the degree of saturation of the sleeve 18 an appropriate amount in the final assembly. After this control winding 20 is in place, the one or more signal coils 22 are wound as toroidal coils through the central passage and over the external surface of the control coil 20.

The sleeve 18 with the coils 20 and 22 therein is then slid over the tube 12 and cemented in place at about the center thereof. The biasing magnets 24 are formed as rings which are lightly press fitted over the tube 12 and cemented in place. These rings typically may be formed from one of the hard magnetic ferrites and are permanently magnetized as shown. It is the purpose of these permanent magnets to bring the saturation of the sleeve 18 to the proper level for the particular application.

During assembly it is a quite simple operation to start the rings 24 into place and make coil electrical connections to appropriate instrumentation, and then with the partial assembly in a fixture for instance to press the rings 24 toward each other until the instrumentation indicates that the proper degree of magnetic biasing has been achieved in the sleeve 18. For a particular application, I prefer that the design be such that proper biasing is achieved when the magnetic rings 24 are quite close to the ends of the sleeve 18 with only enough intervening space to permit minor adjustment to compensate for reasonable manufacturing tolerance in the individual elements. Excessive space between the rings 24 and sleeve 18 makes necessary larger and more powerful magnets 24 and is, therefore, to some extent wasteful.

The device is completed by attaching the mounting clip 16 and the terminals 14 and soldering the coil leads thereto. Preferably also, a thin plastic shrink-on sleeve 26 is drawn over the magnets 24 and coils and shrunk into place to protect the assembly.

In some applications additional adjustment of the magnetic biasing force may be a worthwhile feature to compensate for tolerance of the circuit elements with which the reactor is connected. This additional adjustability, if desired, is accommodated by providing a small permanent magnet in the form of a screw-in slug 28 in the passage 30. By engaging the kerf 32 with a nonmagnetic screwdriver, the slug can be turned in or out as necessary to achieve the preferred final bias.

In the saturable reactor as described, it will be appreciated that the control winding 20 is at right angles to the one or more signal windings 22 and, therefore, cyclical changes in the flux density in the sleeve 18 in the longitudinal direction caused by the control coil will not induce an alternating current in the signal coils. The control coil variable current will, however, change the degree of saturation of the sleeve 18 in a variable fashion and this will cause the inductance of the signal coils to track with the control current variations.

Although the initial bias in this device is achieved by the magnets 24 and 28, in the event the latter is used, it will be appreciated that it is possible to achieve a similar effect, although usually at greater cost, by applying a D.C. component to the control coil or by providing a separate D.C. coil wound, for instance, on top of the control coil 20, and by applying thereto a D.C. current of suitable value.

For most systems the reactor as set forth above can be designed to have the characteristics necessary for a particular application. It will be noted, however, that although the magnetic circuit for the signal coils is complete within the sleeve 18, the magnetic circuit for the control coil 20 is completed through the surrounding air. The gain of the reactor may be too limited, therefore, for certain special purposes. If more gain is desired, the modification illustrated in FIG. 4 is to be preferred.

Figure 4:
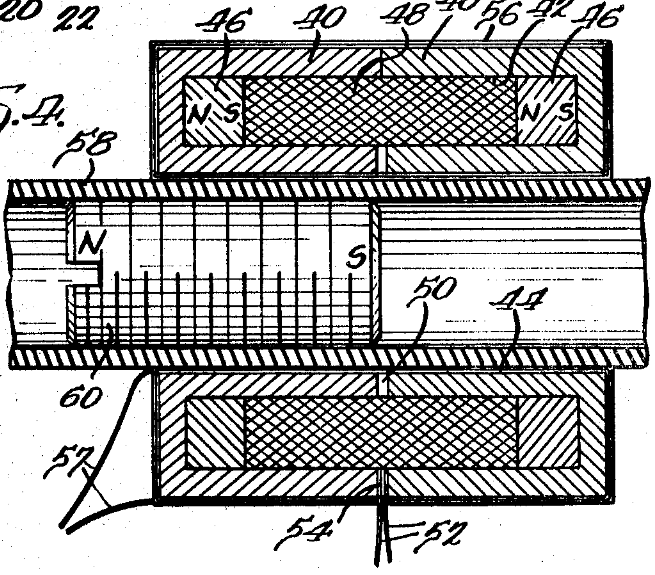
FIG. 4 is a longitudinal medial sectional view, similar to FIG. 2, but showing a modification particularly adapted for applications where higher gain and/or better shielding is desirable.
Figure 3:
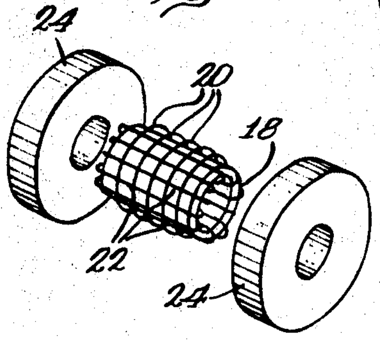
FIG. 3 is a diagrammatic exploded perspective view illustrating the relationship of the principal elements of the assembly of FIGS. 1 and 2.

In the device of FIG. 4, a pair of cup cores 40 when together, mouth to mouth, provide a complete toroidal magnetic circuit, excepting for a narrow annular gap 50 at the inside center. The cups, which are formed of the same type material as the sleeve 18, enclose an annular space 42 and provide an axial passage 44. Ring-shaped permanent magnets 46, much like the magnets 24, are provided and they are dimensioned to fit the space at the bottom of the annular space 42 in each of the cup cores. The control coil 48 is prewound and has dimensions such that it can be slipped over the stems at the axis of the magnetic circuit and fit the annular space 42 between the magnetic rings 46 when the cup cores are together.

Thus, during assembly, the permanent magnets 46 are put in place, the control coil 48 which for certain applications may be more than one coil, such as if D.C. bias is used, for instance, is slid over one of the stems with its leads 52 passed through a small notch 54 in the edge of the cup, the stem of the other cup is entered into the coil opening and the cup cores closed together. Preferably some cement is used to hold the cups together and, if necessary, to fix the coil 48 if it is slightly loose.

The one or more signal coils 56 are wound in toroidal fashion through the core axial passage 44 and around over the outside of the cup cores, much as in the first example, the leads being brought out at 57. Subsequently, the core and coil assembly can be cemented to a tube 58 having mounting means and terminals, not shown, but which may be substantially identical to the arrangement of FIG. 1. A magnetic biasing trimming slug 60 is provided in the same manner and for the same purpose as the similar slug 28 of FIG. 2. If this trimming slug is not needed, the gap at 50 is preferably closed, since it is provided to make adjustment of the slug 60 more effective in changing the saturation bias of the magnetic circuit.

In this embodiment the principle of operation is the same as in the previous example, but the magnetic circuit for both coil systems is complete within the magnetic material and the gain is, therefore, higher, also the control coil 48 is completely enclosed and shielded by the magnetic circuit and for some purposes at least this will be an advantage.

From the above description it will be apparent that variable reactors embodying the teachings of this invention can be manufactured at low cost and that there is no requirement for achieving any special balance as between opposed electrical and magnetic circuits in order to prevent signal induction as between the control and signal coils. Also, positioning and adjusting the biasing magnets is quite simple and straightforward and easy of accomplishment. It will be understood, also, that variations of the arrangements shown are contemplated and may be made without departing from the scope and spirit of the invention, and that, therefore, the scope of the invention is to be measured from the scope of the following claims.

Having described my invention what I claim as new and useful and desire to secure by Letters Patent of the United States is:

1. A variable reactor comprising a core of saturable magnetic material having an axial passage therethrough, a coil wound upon said core with the turns of said coil essentially normal to the axis of said core, a second coil wound in toroidal fashion upon said core with the turns of said second coil essentially parallel to the axis of said core, magnetic biasing means arranged for partially magnetically saturating said core, said biasing means comprising means for producing a stable magnetic field, the last said means being adjacent said core such that said magnetic field passes through said core, and mounting means securing the aforesaid elements in said relationship.

2. A variable reactor as called for in claim 1 in which the means for producing a stable magnetic field is permanently magnetic.

3. A variable reactor as called for in claim 2 in which the permanently magnetic biasing means comprises a pair of permanent magnets which substantially touch the ends of said core.

4. A variable reactor as called for in claim 3 in which said mounting means comprises a tube passed through said permanent magnets and said core with the coils thereon, said core and said magnets being secured to said tube.

5. A variable reactor as called for in claim 4 including a permanent magnet slug disposed to be longitudinally adjustable within said tube.

6. A variable reactor comprising a toroidal cup core assembly formed of saturable magnetic material, said cup core assembly providing a closed annular space and a passage at the axis thereof, a pair of permanent magnets, one at each end of said cup core for magnetically biasing said cup core, a first coaxial coil within said closed space and between said magnets, and a second coil wound in toroidal fashion through said axial passage and over the external surface of said cup core assembly.

7. A variable reactor as called for in claim 6 in which said magnetic biasing means comprises a pair of ring-shaped permanent magnets disposed within said annular space at either end of the first said coil and in which said rings and the first said coil substantially fill said closed space from end to end.

8. A variable reactor as called for in claim 7 including a permanent magnet element disposed to be longitudinally adjustable within said passage.

References Cited

UNITED STATES PATENTS

| | | | |
|---|---|---|---|
| 1,896,510 | 2/1933 | Given | 336—110 |
| 3,012,177 | 12/1961 | Montimer | 336—110 |

FOREIGN PATENTS

| | | |
|---|---|---|
| 1,219,384 | 12/1959 | France. |
| 147,436 | 6/1949 | Australia. |

OTHER REFERENCES

German printed application 1,004,400, March 1957.

LEWIS H. MYERS, *Primary Examiner*.

T. J. KOZMA, *Assistant Examiner*.